US011887468B2

(12) United States Patent
Williams

(10) Patent No.: US 11,887,468 B2
(45) Date of Patent: Jan. 30, 2024

(54) SYSTEM AND METHOD FOR ACTIVE SHOOTER DETECTION AND EVACUATION GUIDANCE

(71) Applicant: Ernest Eugene Williams, Frisco, TX (US)

(72) Inventor: Ernest Eugene Williams, Frisco, TX (US)

(*) Notice: Subject to any disclaimer, the term of this patent is extended or adjusted under 35 U.S.C. 154(b) by 0 days.

(21) Appl. No.: 17/559,265

(22) Filed: Dec. 22, 2021

(65) Prior Publication Data

US 2022/0262212 A1 Aug. 18, 2022

Related U.S. Application Data

(63) Continuation of application No. 16/932,317, filed on Jul. 17, 2020, now Pat. No. 11,210,910.

(51) Int. Cl.
*G08B 3/00* (2006.01)
*G08B 5/36* (2006.01)
*G08B 17/08* (2006.01)

(52) U.S. Cl.
CPC ............... *G08B 5/36* (2013.01); *G08B 17/08* (2013.01)

(58) Field of Classification Search
CPC ...... G08B 5/36; G08B 17/08; G08B 13/1672; G08B 7/066
USPC ....................................................... 340/691.4
See application file for complete search history.

(56) References Cited

U.S. PATENT DOCUMENTS

2004/0170015 A1* 9/2004 Hamrick ................ G08B 7/062 362/812
2019/0295207 A1* 9/2019 Day ....................... G08B 21/02
2019/0295397 A1* 9/2019 Eckert ...................... G08B 5/36
2020/0402378 A1* 12/2020 Connell, II ............... H04L 9/14

* cited by examiner

*Primary Examiner* — Tai T Nguyen
(74) *Attorney, Agent, or Firm* — Scott R. Zingerman; Gable Gotwals

(57) ABSTRACT

A system and method for finding the proximate location of an indoor active shooter including: a plurality of acoustic sensors for receiving acoustic information from a monitored area, the sensors being dispersed in the monitored area, and each sensor having a processor for discriminating gunshot candidates from other sounds; and a host processor/server for receiving the gunshot candidates from the sensor and provide further processing to determine if the gunshot candidate is a gunshot. The server may use the first sensor to report as the proximate location of the shooter. As nearby sensors report the same incident, the server may refine the proximate location to within a few feet of the actual location of the shooter. The host processor includes a program or instructions to determine exit routes from the detected shooter and to activate a warning system which directs people away. The warning system includes a plurality of signaling lights capable of producing light in a plurality of selectable colors such that the host processor commands the lights to signal colors which warn people of the direction of the proximate location and other colors which direct people away from the proximate location.

8 Claims, 9 Drawing Sheets

SYSTEM AND METHOD FOR ACTIVE SHOOTER DETECTION AND EVACUATION GUIDANCE

CROSS-REFERENCE TO RELATED CASES

This application is a continuation of U.S. patent application Ser. No. 16/932,317 entitled SYSTEM AND METHOD FOR ACTIVE SHOOTER DETECTION AND EVACUATION GUIDANCE filed on Jul. 17, 2020 which claims the benefit of U.S. provisional patent application Ser. No. 62/862,233 entitled SYSTEM AND METHOD FOR ACTIVE SHOOTER DETECTION AND EVACUATION GUIDANCE, filed on Jun. 17, 2019, the contents of which are hereby incorporated by reference.

FIELD OF THE INVENTION

The present invention relates to a system and method for detecting gunfire in an indoor location. More particularly, but not by way of limitation, the present invention provides a system and method for detecting the location or proximity of an active shooter and providing an indication of the safest exit route to people in the building.

BACKGROUND OF THE INVENTION

Over the past few decades, mass shooting events have become all too commonplace. While transpiring, these events have come to be referred to as “active shooter” situations. These events tend to occur most often at schools, theaters, churches, shopping malls and in the workplace. Places with dense populations of innocent, unarmed victims with little or no warning.

With the onslaught of mass shootings, a number of systems have been proposed to deal with these events. Generally speaking, these systems tend to focus on alerting authorities or local security personnel of the shooters and their locations. What is less common are systems for providing the local population with guidance for getting away from the shooter.

A person who finds himself, or herself, in an active shooter situation, becomes trapped in a confusing, chaotic situation without the benefit of external guidance. The choices the person faces include having to make snap decisions whether to: flee; shelter-in-place; or fight. Yet, time spent debating these options can result in death. A single second can make the difference between a successful escape or death. Compounding the decision-making process is the fact that it is nearly impossible to tell the direction of gunfire in an echo rich environment, such as in a building or a concert or sporting venue such as an amphitheater. It is common for one or more echoes to be louder than the original gunshot, depending on obstacles between the person and the weapon. Thus, fleeing away from the perceived direction of the gunfire may actually lead one directly into the line of fire.

Gunfire and sniper detection systems are generally known in the art. Such systems work quite well for outdoor gunfire but are not particularly well suited for indoor gunfire. These systems tend to rely on one or more techniques, namely: difference time of arrival based on the muzzle blast; detecting the sonic boom of the projectile; and/or detecting the infrared signature of the muzzle. For indoor situations, bends in hallways and obstructed acoustic paths present challenges for different time of arrival methods. To detect the sonic snap of the projectile, the bullet must be supersonic and pass directly between two sensors. This is an impractical approach for indoor environments. To detect the infrared signature of the muzzle, at least one camera must have an unobstructed view of the weapon. This is simply not always possible to obtain.

A need, therefore, exists for a system and method for finding the proximity of an active shooter, directing potential victims away from the area of the shooter, and otherwise alleviating the problems discussed above.

SUMMARY OF THE INVENTION

In one preferred embodiment, the present invention works with a gunshot location system to provide a system and method for aiding in the evacuation of potential victims from the proximate location of an active shooter in an active shooter situation. In such an embodiment, the inventive system includes a plurality of gunfire detection sensors dispersed throughout a monitored area; a host processor in communication with the array of sensors; and a system for alerting potential victims as to the safest path to exit the area or find shelter (a secure location) within or outside the area. The host processor preferably includes a memory having a stored floorplan of the area including points for egress, stairways, and any securable areas. The host processor includes a program or instructions to determine safe routes from the proximate location of a detected shooter and to activate a warning system which directs people to safety.

As used herein, the term “monitored area” may include an indoor location such as a store, building, terminal or the like and may also include mixed indoor/outdoor areas such as, without limitation, concert, theatre and sports venues (stadiums), parking structures, train, bus, subway or metro stations/platforms, and the like.

In addition, this embodiment may use colored lighting to indicate the safest route. By way of example, and not limitation, when a shooter is detected, if a person looks in the direction of the shooter, a red light will be observed, if the person looks in the direction of the best evacuation route, a green light will be observed.

Further, if a potential victim sees a red light in all directions, the person would know that there is no safe route from the proximate location of the shooter and the situation requires an immediate decision between finding shelter (shelter in place) or fighting the active shooter. In areas where sheltering in place may be the best option, the person might find yellow lights in the preferred direction of evacuation and red in the direction of the shooter. The person would know that flight would pose a major risk but might be possible.

In another preferred embodiment, the inventive system provides a system and method for finding the proximity of an indoor active shooter (proximate location) including: a plurality of acoustic sensors for receiving acoustic information from a monitored area, the sensors being placed in at least somewhat regular intervals along hallways in a building, or otherwise dispersed in the monitored area, and each sensor having a processor for discriminating gunfire from other sounds; and a server for receiving an indication of gunfire from the sensor. Preferably the server uses the first sensor to report as the proximate location of the shooter. As nearby sensors report the same incident, the server may refine the position to within a few feet of the actual location of the shooter. It should be noted that the different time of arrival solutions are relatively simple as the acoustic signal is confined to the paths defined by the shape of the interior spaces within the building.

A basic embodiment of the system for detecting a gunshot from an active shooter and providing evacuation guidance of the present disclosure includes: an acoustic sensor adapted to provide an electrical signal representative of received acoustic information; a processor in communication with the acoustic sensor adapted to process the electrical signal to detect the gunshot; a signaling light adapted to produce light in a color; wherein the processor provides commands to the signaling light to provide an indication of a path away from the gunshot. The acoustic sensor may be a microphone. A plurality of acoustic sensors may be in communication with the processor and may include a network interface such that the communication is via a network. The signaling light may be adapted to produce directional light in a plurality of selectable colors. In this basic embodiment the acoustic sensor may detect a gunshot and the processor may command the signaling light to indicate either red or green or perhaps include directional light so that an observer from one direction sees red indicating a first path of travel toward the proximate location while another observer from another direction may observe a green light indicating a second path of travel away from the proximate location.

The basic system may include a plurality of signaling lights, each of the plurality of signaling lights adapted to produce directional light in a plurality of selectable colors and each of the plurality of signaling lights adapted for receiving commands from the processor regarding the color of light to produce. The signaling light may be adapted to emit light in at least a first direction and in a second direction and wherein the color of the light produced in the second direction may be controlled independently of the color of the light produced in the first direction. A first sensor of the plurality of sensors may be collocated with at least the first signaling light of the plurality of signaling lights and the first sensor and the first signaling light may share a network interface.

The system may include a host processor in communication with the processor for receiving a gunshot candidate from the processor and the host processor may provide additional processing to determine if the gunshot candidate is a gunshot and wherein the host processor may determine a proximate location of the source of the gunshot and provide commands to the signaling light to provide an indication of a path away from the proximate location. In another embodiment the processor may itself provide the additional processing to determine if the gunshot candidate is a gunshot and may determine proximate location of the source of the gunshot and provide commands to the signaling light.

A preferred method for detecting a gunshot from an active shooter and providing evacuation guidance according to the present invention includes the steps of: providing a plurality of sensors in a monitored area, each sensor adapted for: providing an electrical signal representative of acoustic information received by a microphone; processing the electrical signal to detect a gunshot candidate; providing the gunshot candidate via a network. A plurality of signaling lights are provided in the monitored area, each light adapted for producing light in a plurality of selectable colors and each light adapted for receiving commands regarding the color of light to produce. Providing a host processor adapted for: receiving the gunshot candidate from at least one of the plurality of sensors via the network, determining if the gunshot candidate is a gunshot; determining a proximate location of the source of the gunshot; and; providing commands to at least a portion of the plurality of signaling lights to provide an indication of a path away from the proximate location.

Further objects, features, and advantages of the present invention will be apparent to those skilled in the art upon examining the accompanying drawings and upon reading the following description of the preferred embodiments.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
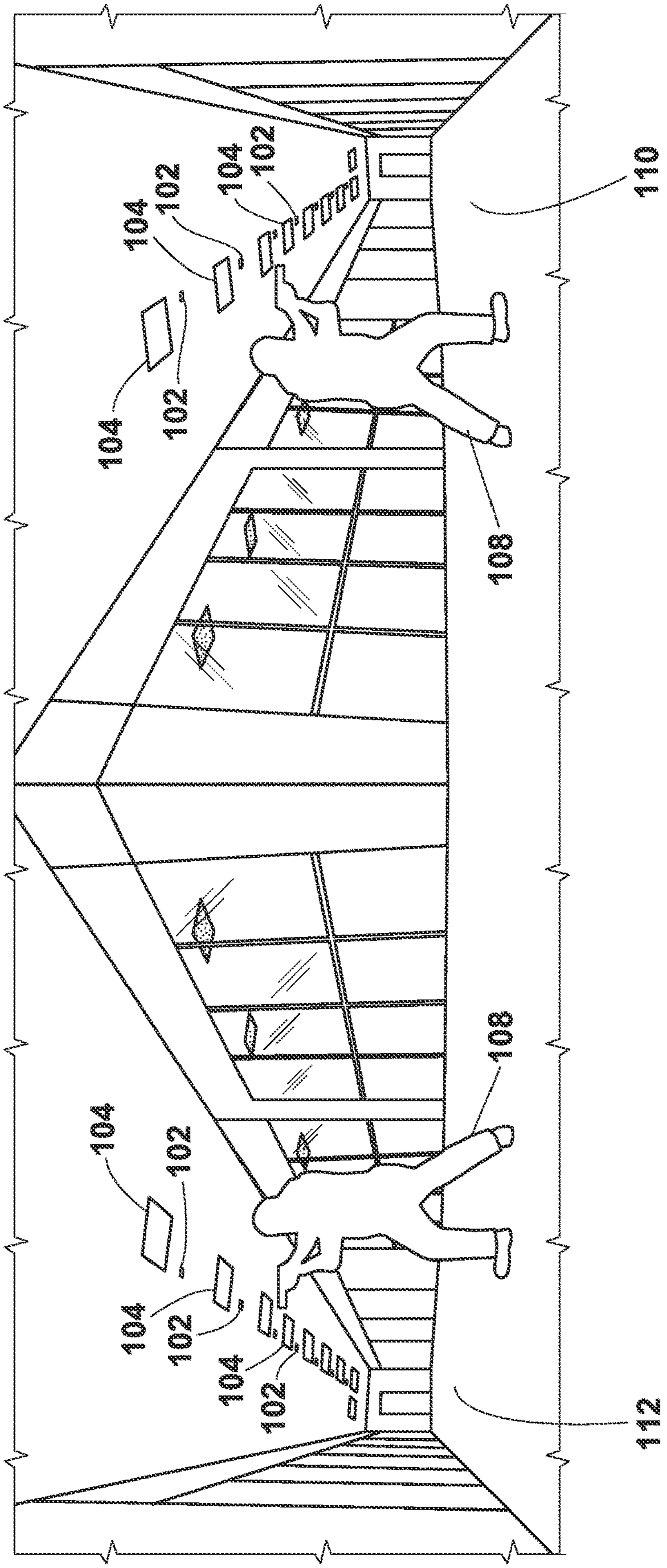
FIG. 1 depicts the inventive active shooter detection system in its general environment.

Referring now to the drawings, wherein like reference numerals indicate the same parts throughout the several views, a representative gunshot detection system 100 is shown in its general environment in FIG. 1. In a preferred embodiment, a plurality of sensors 102 (6 shown) is dispersed along hallways in a monitored area. Preferably, each sensor is placed such that it has a relatively unobstructed acoustic view around its immediate area. While sensors 102 are shown mounted in the ceiling, sensors 102 could be placed in walls, the floor, built into artwork, etc. If an active shooter situation occurs, as depicted by shooter(s) 108, sensors 102 will detect the gunshot(s)/gunfire and the inventive system will illuminate fixtures 104 appropriately. Preferably lights 104 are capable of producing multiple colors of light and will be directed to produce color-coded light to indicate the safest path/route to get away from shooter(s) 108 (proximate location). By way of example and not limitation, fixtures 104 closest to shooter(s) 108 will emit red light, as further down hallways 110 and 112, fixtures 104 might emit orange light, further yet from shooter(s) 108 fixtures 104 might display yellow, and finally further still, green.

It should be noted that fixtures 104 may provide directional lighting such that, even in a green area, a person looking towards the shooter will see red while looking towards a safe exit, see green. Ideally, from anywhere in the building/monitored area, a person can immediately detect the safest direction to flee. As used herein, the term direction light (lighting) shall include a light source (or fixture) having a field angle of no more than 180°.

Figure 2:
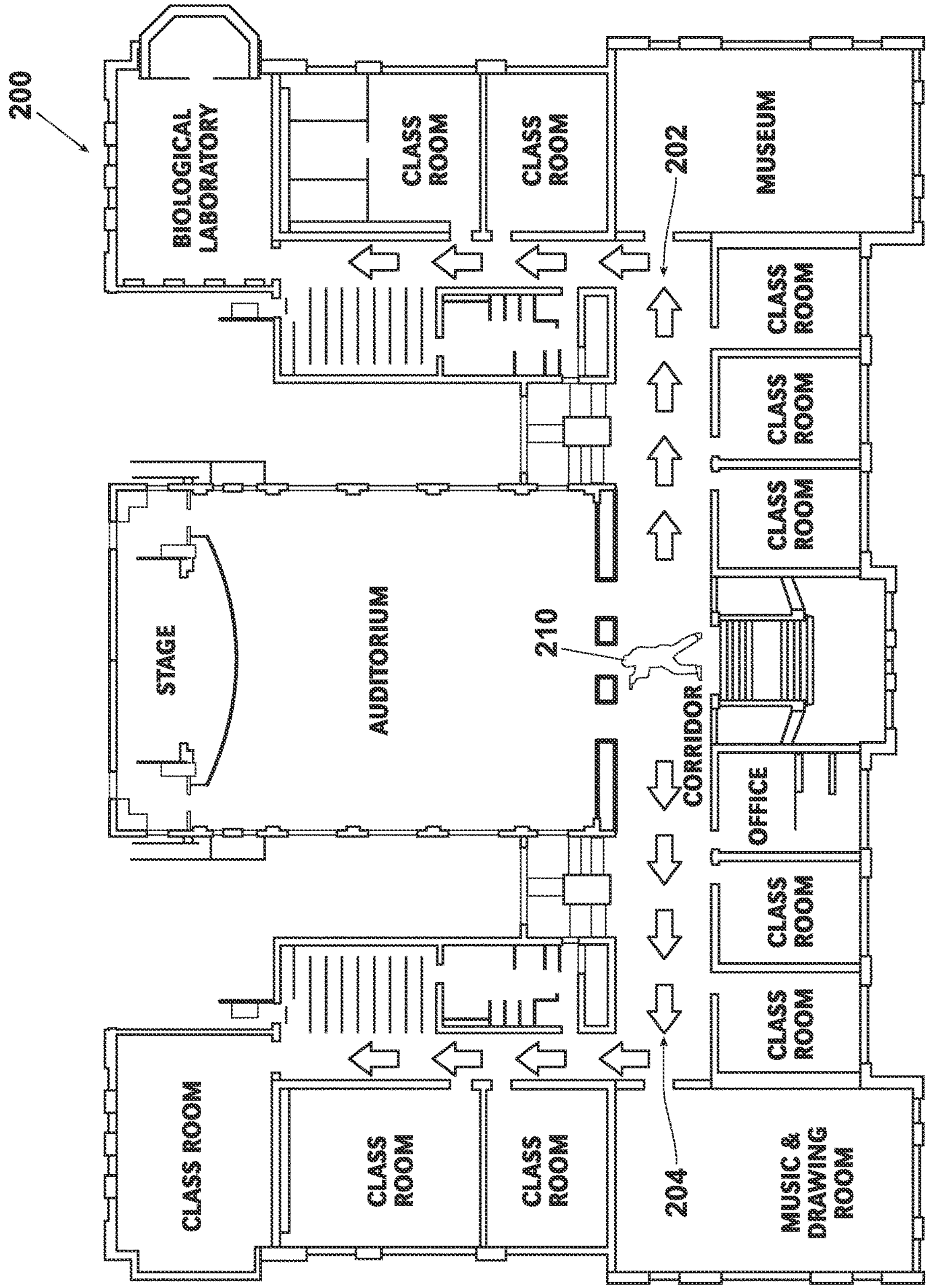
FIG. 2 provides an example of a floor plan of one floor of a building having the inventive system.

Turning next to FIG. 2, most preferably a floor plan 200 of a building will be used to determine safe exits. Thus, using known routing techniques, a host processor/server, as discussed in more detail below, will be programmed to find the shortest safe paths 202 and 204 away from the shooter 210 or the proximate location of the shooter 210. The ultimate goal is to get people through an exit or to a safe area. However, if no safe path exists on a particular floor of the building, people may be directed to a stairway, through a common area, or otherwise directed to an area where a safe exit or a safe area exists.

Figure 3:
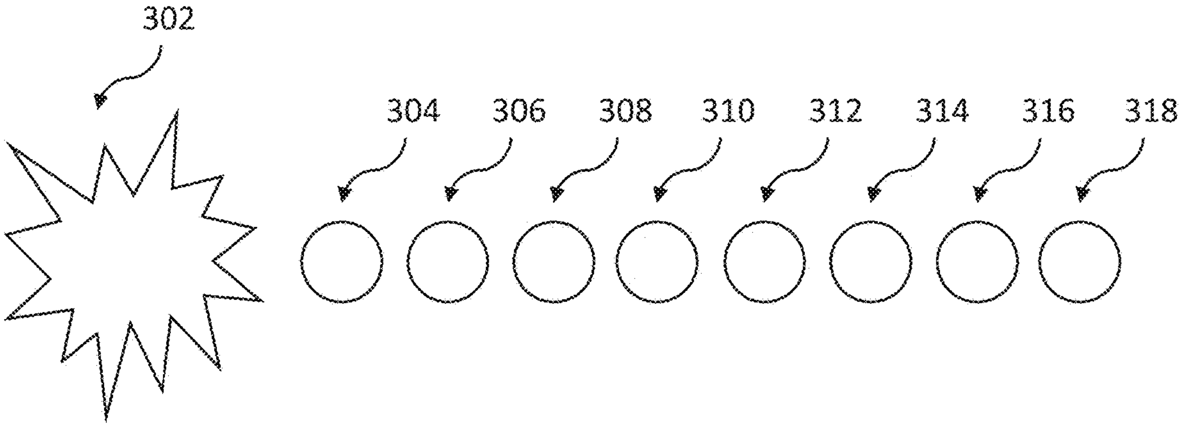
FIG. 3 provides a diagram of colors used in conjunction with an active shooter situation in one preferred embodiment of the present invention.

With reference to FIG. 3, shades of each color may be used to provide nuances in the risk of a particular path or to indicate a most favorable route for egress. For example, dark red 302 may be reserved for the area immediately proximate the shooter (proximate location). Bright red 304 may indicate extreme risk and indicate that a person is well within the sighting range of the shooter's weapon. Orange 306 may indicate extreme danger but not under the imminent threat of red 304. Yellow 308 may indicate the first point at which escape is recommended, certainly not an area where a person would loiter or be indecisive. Bright yellow 310 might indicate a slight improvement over the yellow condition. Yellow-green 312 might indicate the first level where the person is no longer in the direct line of fire, such as around a corner, obstacles between the position and the shooter, or the like. Green-yellow 314 might indicate a position where one is safe for the moment, but that could change in an instant if the shooter is on the move. Bright green 316 might indicate relative safety, but indicate an instruction to continue rapid movement towards the exit. Finally, dark green 318 might indicate the exit from the monitored location. Obviously, these colors are provided by way of example and not limitation. Any color could be used for any condition and any number of colors could be used from two, one for moving towards safety and one for moving toward danger, to a continuous spectrum where one moves along the spectrum from relative danger to relative safety. It should also be noted that the colors provide first responders with a direct path to the shooter. A first responder would move from green towards yellow, and on toward red.

In another embodiment, the signaling lights closest to the proximate location of the active shooter may flash red/blue/red/blue which is a known indicator of a hazard or a law or security enforcement presence. These lights may also act to disrupt/disorient (visually, consciously, subconsciously or the like) or instill a belief of a law enforcement presence. Such disruption/disorientational doubt may motivate the shooter to flee, or at least provide valuable seconds for persons/potential victims to flee the proximate area.

Figure 4:
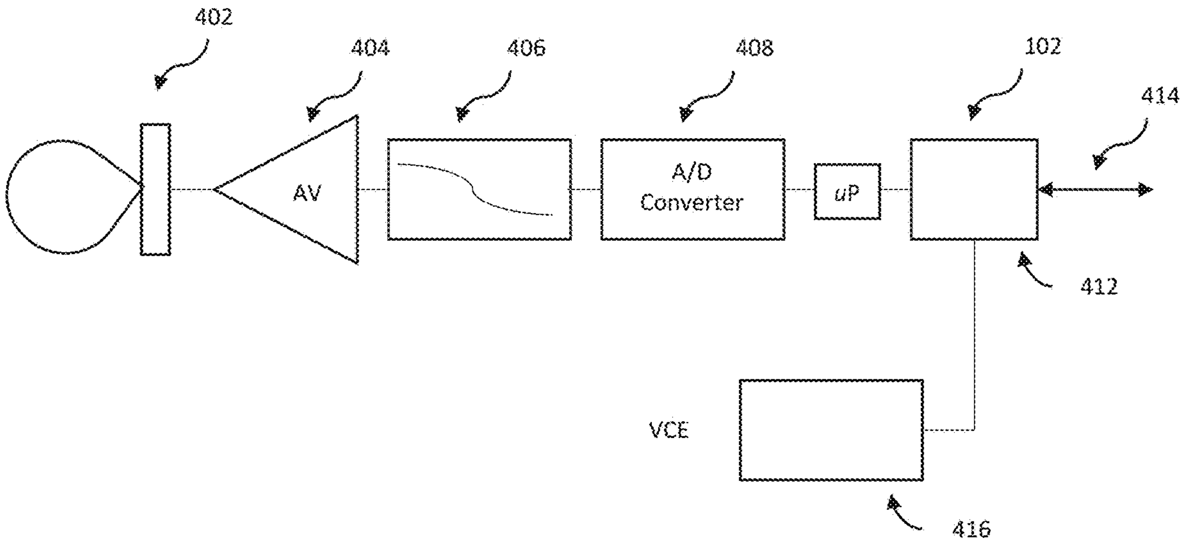
FIG. 4 provides a block diagram of an acoustic sensor which could be used with various embodiments of the preferred invention.

A block diagram of a sensor 102 suitable for use with the present invention is shown in FIG. 4. Acoustic sensor 102 includes: a microphone 402, or other acoustic transducers, for providing an electrical signal representative of received acoustic information; an amplifier 404 providing gain to boost the signal from microphone 402; optionally, a signal processing block 406 for processing the amplified signal from amplifier 404; an analog to digital converter 408 for digitizing the processed signal from signal processor 406; a computer 410 for analyzing the digital information from ADC 408; and network interface 412 for bidirectional communication with a server. In one preferred embodiment, interface 412 is an Ethernet interface and sensor 102 receives electrical power via the ethernet cable 414. One scheme for accomplishing this is known as power-over-ethernet, for which there are widely adopted standards. Voltage regulator 416 receives power coming from the ethernet cable and regulates the voltage at levels appropriate for powering the various systems of the sensor.

With regard to microphone 402, several types of microphones are readily available, i.e. electret condenser, dynamic, ceramic, piezo, etc. It should also be noted that amplified microphones are readily available and could be used to simplify sensor 102, an amplifier 404 and possibly signal processing block 406 could be located within the microphone. Even more dramatic simplification could be obtained by using a so-called digital microphone. Typically, such microphones include an amplifier, anti-aliasing filter, and A/D converter all housed within the microphone. Most digital microphones provide an industry standard digital audio interface, such as the i2s bus. Suitable microphones are available from TDK InvenSense of Tokyo, Japan, as well as other manufacturers. It should be noted that blocks 402-408 are still present within sensor 102, they are merely incorporated into microphone 402.

Signal processing block 406 is, at a minimum, and anti-aliasing filter, preferably at least a second-order lowpass filter. Aliasing occurs when digital sampling aligns with high-frequency noise in a signal. This phenomenon is minimized by lowpass filtering the signal at a frequency approximately half the sample rate of the analog to digital converter. In addition, signal processing block may provide addition processes such as high-pass filtering, logarithmic gain, or other functions which might improve the performance of sensor 102.

In one preferred embodiment, the A/D converter 408 is located within processor 410. However, many options are available. For example, a standalone analog to digital converter could be used or an audio CODEC. One suitable CODEC is the ADAU-1372 available from Analog Devices located in Norwood, MA. This particular device offers bias voltage for direct connection to electret condenser microphones, internal programmable gain, an anti-aliasing low-pass filter, and an A/D converter. The digital output is provided by one, or two i2s interfaces. Like the digital microphone, this solution provides several of the functional blocks required for the sensor, in a single package.

Figure 5:
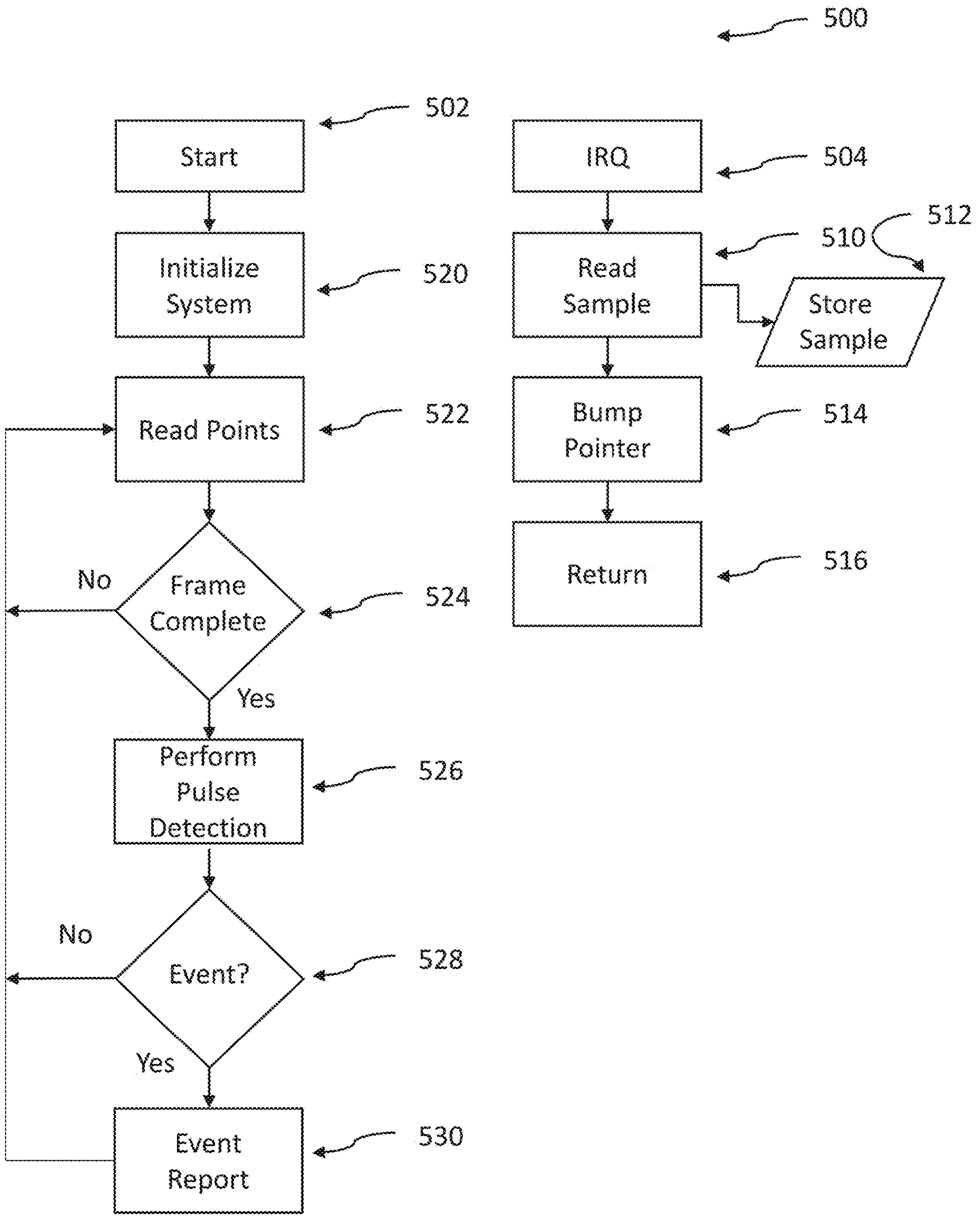
FIG. 5 provides a flow chart of the audio processing employed in the sensor of FIG. 4.

With regard to computer 410, the term "computer" is used in its broadest sense and includes microprocessors, microcontrollers, FPGAs, and the like. Computer 410 is simply a device that can process stored instructions. A flow chart for one preferred embodiment of a program to analyze the audio signal from ADC 408 is shown in FIG. 5. Program 500 is preferably divided into two parts, a background routine 504 which is executed in response to a periodic interrupt, and a foreground routine 502 which first initializes the machine and then falls into an infinite loop processing incoming audio information.

Interrupt service routine 504 reads a sample from the analog converter at step 510, stores the sample in a recirculating buffer at step 512, bumps the address pointer to the next location in the recirculating buffer at step 514, and returns to the foreground process at step 516. As will be apparent to one skilled in the art, step 514 would compare the address pointer to a max value after incrementing the pointer and reset the pointer to the start of the buffer when the max value is reached. Other periodic functions could be handled in the interrupt service routine, such as housekeeping functions, keep alive messages to the server, service of a watchdog timer, or any other periodic process useful to sensor operation.

As mentioned above, the main program 502 initializes the machine from a power-on condition or reset at step 520. Once the processor and variables are initialized, the program enters a continuous loop at step 522. In the main loop, the processor monitors the number of samples taken since the last analysis until a complete frame of data has been collected at step 524. Next, at step 526 impulse detection is performed. A number of techniques for detecting impulsive sounds, such as: using convolution to compare the audio information to a reference envelope; performing envelope detection and comparing envelope characteristics to know gunshot parameters; or even just looking for exceptionally loud sounds where the raw amplitude crosses a threshold. This list of techniques is given by way of example and not limitation. Operation of the invention detector is simply not dependent on the method used to detect gunshots. If an impulsive event is detected at step 528, the event information is forwarded to the server at 530 and the process returns to the top of the continuous loop at step 522.

Figure 6:
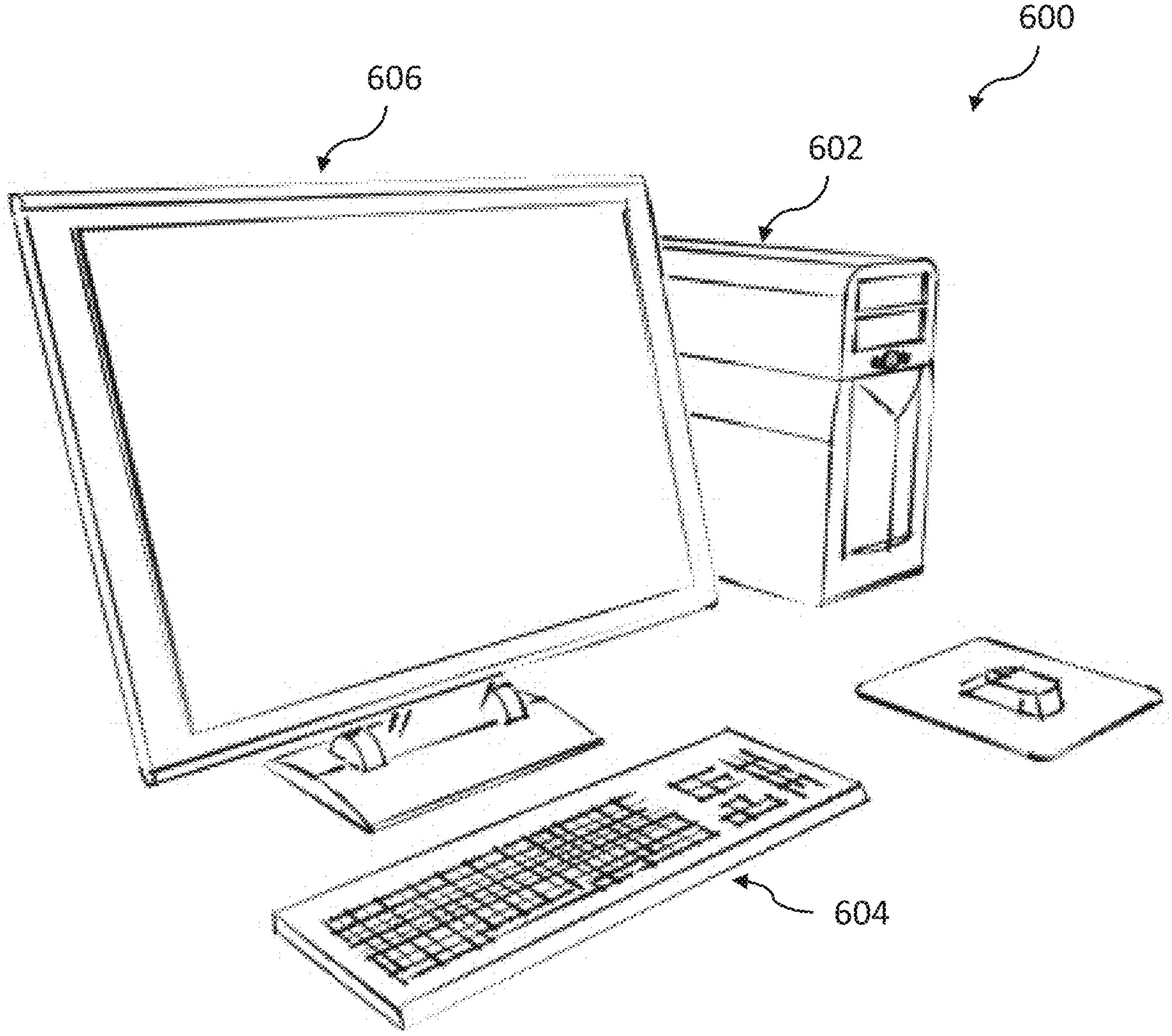
FIG. 6 depicts a server suitable for use with various preferred embodiments of the present invention.

FIG. 6 depicts the desktop computer 600 which could be used as a server in the present invention. Computer 600 includes a CPU 602, a keyboard 604 for receiving input from a user; and a display 606 for providing information to the user. In addition, it should be understood that computer 600 has mass non-volatile storage, such as a hard drive, solid state drive, SD card, etc., for storing programs, configuration information, floor plans, system history, and the like. While shown as a desktop computer, server 600 could take any one of a variety of forms, including, but not limited to: a rack mount computer, a tower, or even a simple single board computer could perform the operations required of server 600.

Figure 7:
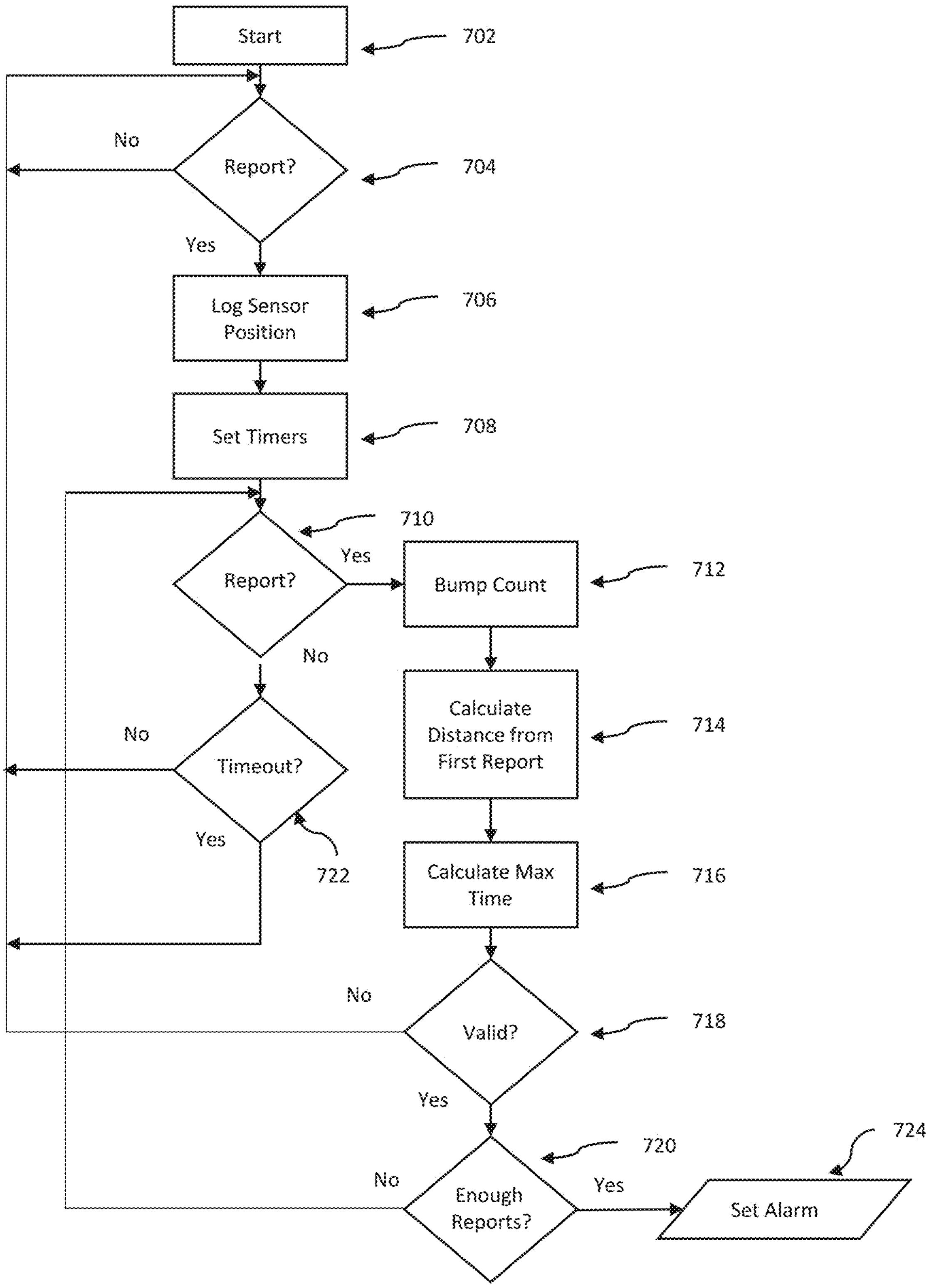
FIG. 7 provides a flow chart for a preferred method for validating an active shooter event in the server of FIG. 6.

In turn, FIG. 7 provides a flow chart for an application 700 intended to run on the server to: collect reports from sensors; discriminate gunfire from other impulsive sounds; and in the event of gunfire, active the warning system. Application 700 starts execution at 702, it is assumed the server is running an operating system such as Microsoft Windows, Linux, or the like. Program 700 begins a continuous loop starting at step 704 and waits for a sensor to report an event. When a report is received, application 700 determines the location of the sensor at step 706. While the unit of measure is arbitrary, for purposes of explanation, English units of measure will be used for this disclosure. By way of example, a sensor location might be stored as an x, y position relative to a chosen datum, and a floor number. Next, the application would start a timer at set 708. The application would calculate the distance to the furthest sensor on the same floor level as the first reporting sensor and the time required for the sound to travel that distance. If the timer expires prior to receiving enough reports to ensure the sound was a gunshot, the event will be canceled without generating an alarm.

As will be apparent to one skilled in the art, in the inventive system false alarms are nearly as intolerable as missing an active shooter event. Thus, the server needs a method for determining the difference between a low energy impulsive event such as a hand clap or a dropped book landing flat on the floor, and a gunshot. One scheme for discriminating high energy events is by measuring the distance over which sensors still report the event. Even the loudest dropped object will likely only trigger sensors fifty to sixty feet away, while a gunshot will trigger sensors five or six hundred feet away. The speed of sound is roughly 1125 feet per second at room temperature. Accordingly, if a sensor 200 feet away does not report an event approximately 178 milliseconds after the first reporting sensor, it is likely not an active shooter event.

At step 710 the server continues to wait for additional sensors to report. When each sensor reports, the application increments a count of the number of reporting sensors at step 712, calculates the distance from the first reporting sensor to the present reporting sensors at step 714, determines the amount of time it should have taken for the sound to reach the newly reporting sensor at step 716, and determines at step 718 if this is a valid report relative to the first reporting sensor. At step 720, the application checks to see if a sufficient number of sensors reported the same event and to see if the event was reported over a sufficient distance to ensure it is actually gunfire. If not, application 700 continues to wait for more reporting sensors, and check to see if the timer has expired at step 722. If enough sensors have reported the event, application 700 set an alarm at step 724.

Figure 8:
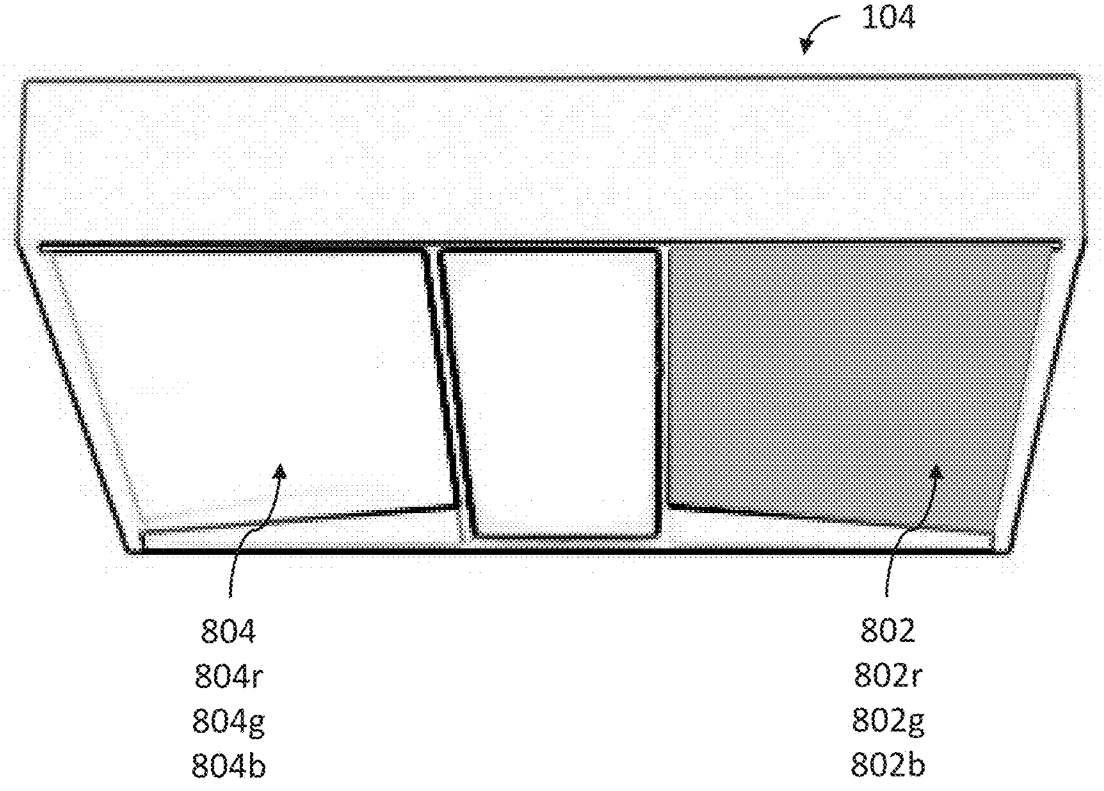
FIG. 8 depicts a preferred embodiment of a warning light suitable for use with the present invention.

Turning to FIG. 8, while the inventive system can produce an audible warning and alert authorities nearly instantly as to an active shooter event, the most important aspect of the present invention is its attempt to save lives by facilitating a rapid and orderly evacuation of the building along predetermined safe routes. This is achieved by providing a visual indication to people of the route as discussed above. One preferred embodiment for providing such a visual indication is light fixture 800. When viewed from the side, fixture 800 includes a plurality of left facing LEDs 802 and a plurality of right facing LEDs 804. Each LED 802 and 804 is actually a module containing a red LED, a green LED, and a blue LED. By selectively illuminating individual LEDs within a module, seven colors can be produced. While more colors can be obtained by adding the dimming capability for each LED, it would become harder for people to distinguish the differences in shades and could add to the confusion in an emergency if too many colors are available.

Most preferably fixture 800 would be ceiling mounted or configured to be placed near the ceiling on a wall. In a crowded hallway, the higher fixture 800 is mounted, the easier it is for all locations in the hallway to observe. By illuminating LEDs 802 in one color and LEDs 804 in a different color, people looking at fixture 800 from one direction will see one color of light and people looking at fixture 800 from the opposite direction will see a different color of light.

Figure 9:
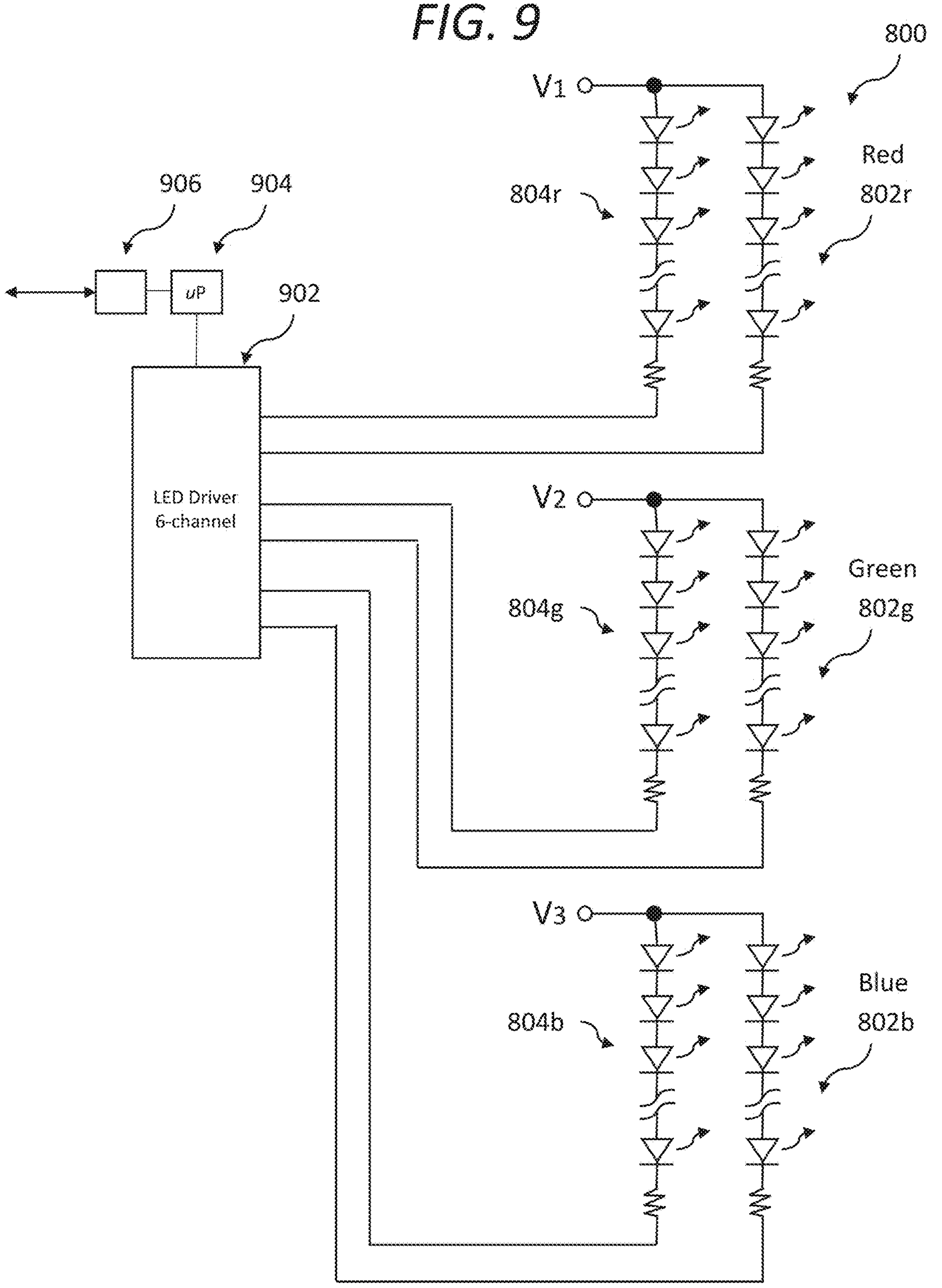
FIG. 9 provides a block diagram of the warning light of FIG. 8.

With further reference to FIG. 9, fixture 800 includes a network interface 906 for receiving color information from the server; a computer 904 for receiving the commands and determining the LED drive requirements, a six-channel LED driver 902 in communication with computer 904 to selectively drive the LED arrays, and LEDs 802*r*, *g*, and *b*, and LEDs 804*r*, *g*, and *b*. While red LEDs 802*r*, green LEDs 802*g*, and blue LEDs 802*b* are shown as individual LEDs, preferably they are aggregated into modules. Such modules could have a single LED of each color or many LEDs of each color. In fact, very dense arrays of LEDs are readily available such as COB modules, flip-chip modules, and the like. The use of integrated large-scale arrays of LEDs is within the scope and spirit of the present invention.

As will be apparent to one of ordinary skill in the art, the inventive system can additionally provide egress direction in case of a fire or other emergency, and routes to safe rooms in the event of a tornado or other dangerous storm. Further, the sensor could be incorporated in the housing of the warning light fixture and share resources, i.e., the network interface and computer, between the two functions. Such modifications are within the scope and spirit of the present invention. Further, while preferred embodiments of the present invention were discussed with a proximity acoustic sensor, the invention is not so limited and could be practiced with different time of arrival, or any other type of gunshot location system.

It should be noted that while preferred embodiments of the present invention have been described in connection with a system using different time of arrival, the invention is not so limited and may be used with any type of gunshot detection system.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A computer aided evacuation system for a building comprising:

a plurality of signal lights located along egress routes throughout the building, each signal light configured to produce direction lights in a plurality of selectable colors, each signal light comprising a first multicolor LED array adapted to be visible in a first direction, a second multicolor LED array directed in a second direction opposite said first direction, a communication interface for receiving instructions, and a processor for interpreting said instructions and lighting said first multicolor LED arrays in a color to direct victims moving towards safety and second multicolor LED arrays in another color to direct first responders moving towards danger;

a host computer having a first communication interface for outputting said instructions to individual signal lights, a second communication interface for receiving notifications of an event to trigger an evacuation, and a processor for determining an evacuation route and providing said instructions; and an array of sensors in communication with said second communication interface to provide an indication of an event, each of said sensors having a known location.

2. The evacuation system of claim 1 wherein said sensors detect gunfire.

3. The evacuation system of claim 1 wherein said sensors detect fire.

4. The evacuation system of claim 1 wherein said first and second communication interfaces are the same interface.

5. The evacuation system of claim 4 where in the interface is an ethernet interface.

6. The evacuation system of claim 1 wherein said first and second multicolor LED arrays include, red, green, and blue LEDs.

7. The evacuation system of claim 1 adapted for manually triggering an evacuation route.

8. The evacuation system of claim 1 wherein green light indicates a safe egress direction and red light indicates an unsafe direction.

* * * * *